(12) United States Patent
Jehlik et al.

(10) Patent No.: US 6,918,384 B2
(45) Date of Patent: Jul. 19, 2005

(54) DIESEL ENGINE WITH CAM PHASERS FOR IN-CYLINDER TEMPERATURE CONTROL

(75) Inventors: Forrest A. Jehlik, Royal Oak, MI (US); Sherif Hussein El Tahry, Troy, MI (US); Roger B. Krieger, Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/730,436

(22) Filed: Dec. 8, 2003

(65) Prior Publication Data
US 2005/0121007 A1 Jun. 9, 2005

(51) Int. Cl.$^7$ .......................... F02M 25/07; F01L 1/34
(52) U.S. Cl. ............................. 123/568.14; 123/90.17
(58) Field of Search ........................... 123/316, 568.11, 123/568.14, 321, 322, 347, 348, 90.15, 90.16, 90.17

(56) References Cited

U.S. PATENT DOCUMENTS

| | | | | |
|---|---|---|---|---|
| 4,700,684 A | * | 10/1987 | Pischinger et al. .... | 123/568.14 |
| 5,918,577 A | * | 7/1999 | Martelli et al. ........ | 123/568.14 |
| 5,934,263 A | * | 8/1999 | Russ et al. ............. | 123/568.14 |
| 2002/0112692 A1 | * | 8/2002 | Abo et al. ............. | 123/568.14 |
| 2004/0074481 A1 | * | 4/2004 | Geiser ................... | 123/568.14 |
| 2004/0139949 A1 | * | 7/2004 | Koseki et al. ......... | 123/568.14 |

* cited by examiner

Primary Examiner—Willis R. Wolfe, Jr.
(74) Attorney, Agent, or Firm—Kathryn A. Marra

(57) ABSTRACT

A cam phaser is mounted on the exhaust camshaft of a diesel engine and is operable to selectively advance timing of only the exhaust valves relative to a nominal position. The purpose of advancing timing of the exhaust valves is to advance valve closing sufficiently to shorten the effective exhaust strokes of the pistons and thus increase the trapped hot exhaust residuals. This occurs when the exhaust valves close earlier than piston top dead center in the normal exhaust stroke phase of engine operation. This increases the in-cylinder temperature so that combustion stability and hydrocarbon emissions are improved.

10 Claims, 3 Drawing Sheets

DIESEL ENGINE WITH CAM PHASERS FOR IN-CYLINDER TEMPERATURE CONTROL

TECHNICAL FIELD

This invention relates to diesel engines and, more particularly, to control of in-cylinder temperature using an exhaust cam phaser.

BACKGROUND OF THE INVENTION

It is known in the art to provide for low compression ratio diesel combustion systems, primarily to minimize emissions of soot and nitrogen oxides (NOx). Low compression ratios, however, are most beneficial during warm engine operation, warm ambient conditions and high engine loads and speeds, but may result in poor combustion quality and excessive hydrocarbon emissions during relatively cool engine operation, cool ambient conditions and at low loads and speeds. It is known in the art to be useful to provide means for varying the compression ratio of a diesel engine to tailor the engine to operating conditions to thereby provide high compression ratios and low compression ratios at optimal times in the engine's operation. Many devices have been proposed for compression ratio variation, including variable valve actuation mechanisms and engine components such as pistons and cylinder heads with movable combustion chamber walls. In general these devices are relatively complex and add significant cost to the manufacture of an engine.

In spark ignition engines, cam phasers are known as simple devices for varying cam timing and thus changing valve timing to the extent permitted by the camshaft layout. These devices normally provide for advancing or retarding the cam timing in order to obtain desirable operating characteristics. It is believed that one of the reasons cam phasers have not been utilized on diesel engines is because the piston to cylinder head clearance is so small that altering intake and exhaust valve timing may result in contact of the pistons with the valves. A simple and relatively low cost apparatus and method for controlling in-cylinder temperature in a diesel engine is desired.

SUMMARY OF THE INVENTION

The present invention provides a desired engine combination by the addition of a cam phaser capable of advancing the timing of only the exhaust valves of a diesel engine in order to increase its in-cylinder temperature. A typical diesel engine has cylinders and pistons defining expansible combustion chambers into which air is admitted and compressed during compression strokes of the pistons. Compression increases the air temperature so that injected fuel is self-ignited and burns, creating power to drive a crankshaft. Intake and exhaust valves, actuated by separate crankshaft driven intake and exhaust camshafts, control timed admission of air to and discharge of exhaust products from the combustion chambers.

In accordance with the invention, a cam phaser is mounted on the exhaust camshaft and is operable to selectively advance timing of only the exhaust valve lift event relative to the crankshaft. The purpose of advancing timing of the exhaust valve event is to advance valve closing sufficiently to increase trapped hot residuals of combustion. This occurs when the exhaust valves close prior to piston top dead center during the normal exhaust stroke phase of engine operation. This allows the trapped residuals to undergo a recompression and expansion about piston top dead center that marks the start of the intake stroke. This increases the in-cylinder temperature when the cooler intake air mixes with the high temperature and high pressure, trapped residuals during the induction process. Combustion temperatures are increased and combustion stability and completeness may be thus improved under various conditions such as cool engine, cool ambient, low load and low speed engine operation.

Additional benefits can be achieved by inclusion of an intake cam phaser in conjunction with the exhaust cam phaser. Such would allow for the minimization of thermodynamic losses by retarding the intake valve timing to a point at which the recompressed hot residual exhaust expands to its formerly uncompressed ratio thereby extracting most of the work added to compress the hot residual exhaust gases.

These and other features and advantages of the invention will be more fully understood from the following description of certain specific embodiments of the invention taken together with the accompanying drawings.

DESCRIPTION OF THE PREFERRED EMBODIMENT

Figure 1:
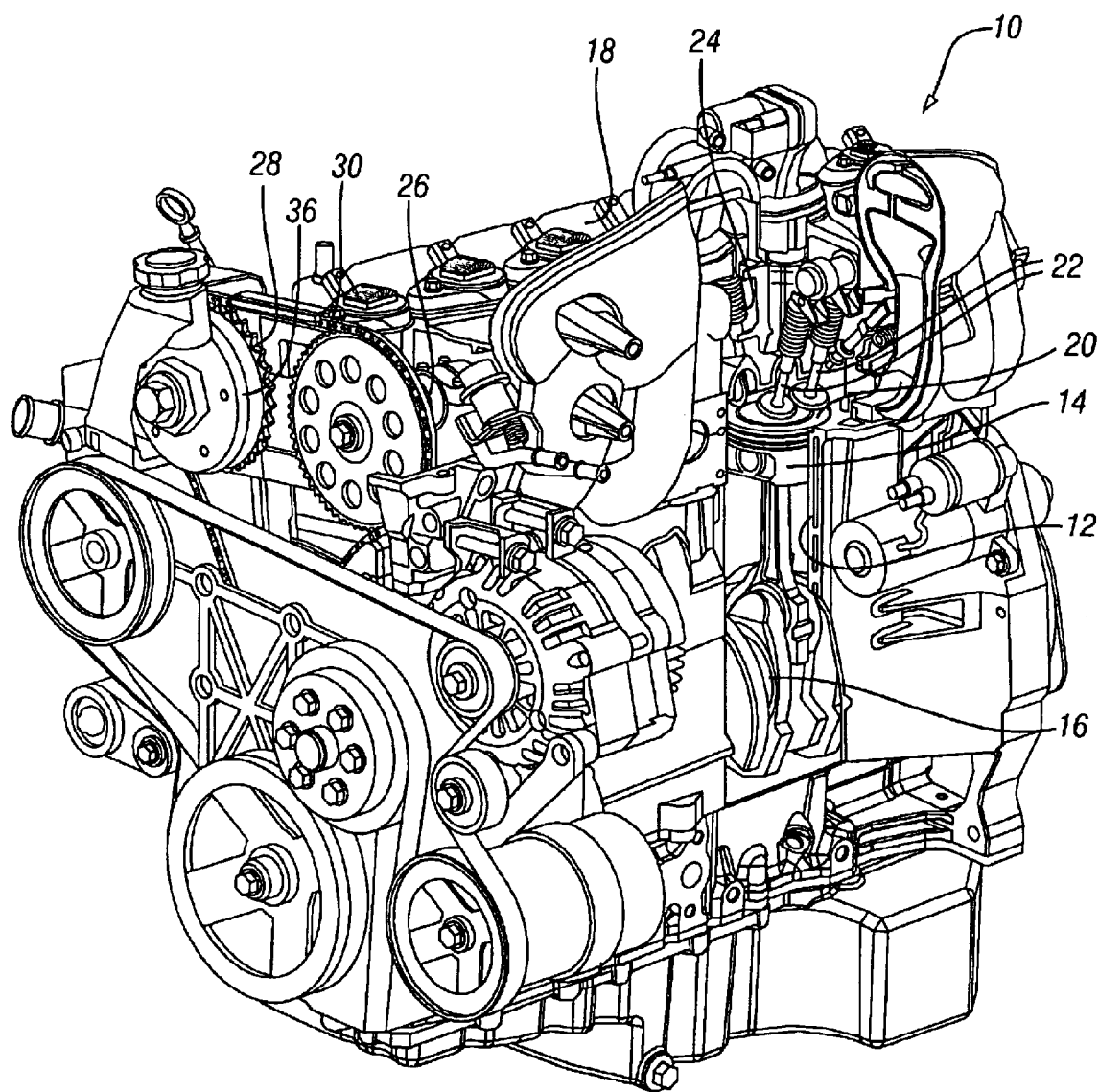
FIG. 1 is a pictorial view of a diesel engine having portions broken away to show the interior construction including application of a cam phaser on the exhaust camshaft.

Referring now to the drawings in detail, numeral 10 generally indicates a diesel engine having a variable compression ratio in accordance with the invention. Engine 10 conventionally includes a plurality of cylinders 12 having therein reciprocable pistons 14 connected with a crankshaft 16. The ends of the cylinder are closed by a cylinder head 18 so that the cylinders and pistons define expansible combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the invention.

The intake and the exhaust valves are actuated by separate intake and exhaust camshafts 26, 28. The intake and exhaust camshafts exclusively operate their respective intake and exhaust valves, however, both are driven by the crankshaft 16 through a timing chain 30.

Figure 2:
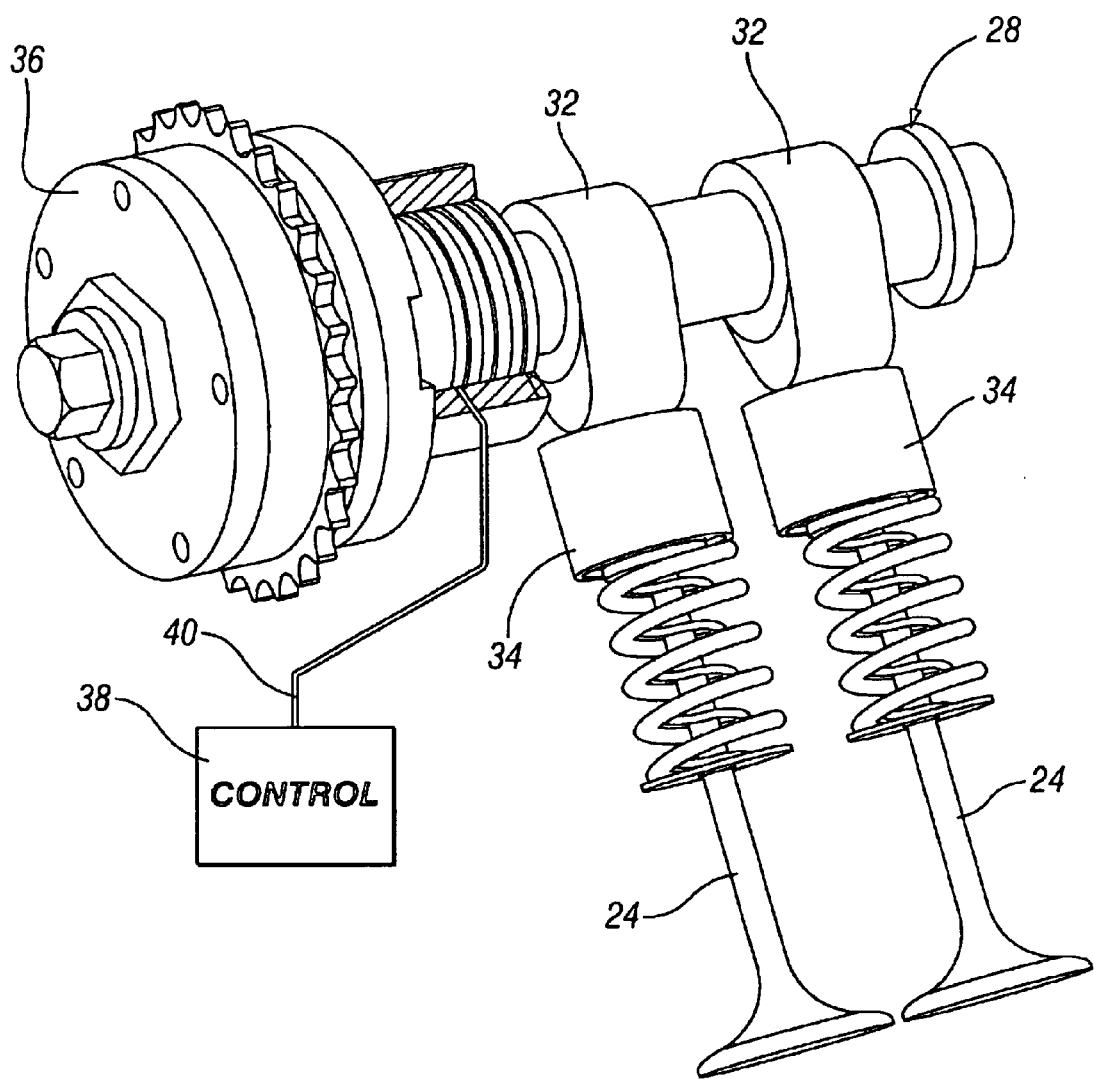
FIG. 2 is an enlarged pictorial view illustrating a portion of the exhaust camshaft together with the exhaust valves and cam phaser.

Referring to FIG. 2, there is shown an enlarged view of a portion of the exhaust camshaft 28 including cams 32 which engage hydraulic valve lifters 34 to actuate the exhaust valves 24. A cam phaser 36 is mounted on an outer end of the exhaust camshaft 28 and is connected with a control 38. Through internal passages 40, indicated schematically, the control 38 provides pressurized oil to the cam phaser as needed to alter timing of the exhaust valves by retarding or advancing their angular position relative to the phase angle of the camshaft. Control 38 comprises a conventional microprocessor-based engine or powertrain controller including CPU, ROM, RAM, I/O circuitry including A/D and D/A conversion and serial data bus communications. Control 38 monitors or derives a variety of parameters used in engine and powertrain controls including non exhaustive exemplary parameters such as engine coolant temperature, intake air temperature and mass flow, manifold pressure, exhaust gas constituents, engine speed, crankshaft and camshaft angles and engine output torque. Control 38 further includes a variety of controlled actuators and control signal therefore such as solenoids and motors including for providing and exhausting pressurized oil to and from the cam phaser to effect positional control thereof.

Figure 3:
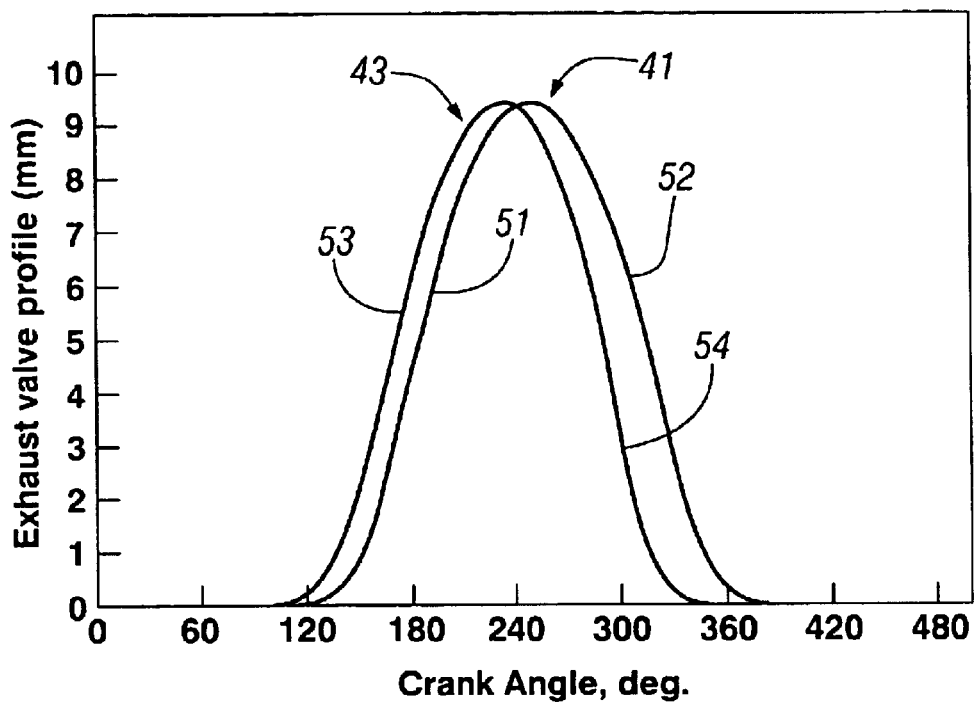
FIG. 3 is a valve lift diagram showing the variation in exhaust cam timing by the cam phaser; and, FIG. 4 shows exemplary in-cylinder gas temperatures corresponding to the valve lift variations illustrated in FIG. 3 at different effective compression ratios.

Referring now to FIG. 3 of the drawings, there is illustrated a valve timing diagram. The lift motion of the exhaust valves are illustrated by various exhaust curves generally labeled 41 and 43. As illustrated, a nominal exhaust curve is labeled 41. The exhaust valve lifts in accordance with the rising curve 51 of the profile and falls in accordance with the closing curve 52 of the profile. Exhaust valve opening (EVO) for this profile begins at about 113 degrees after top dead center (ATDC) and rises on lift curve 51 to a peak at about 250 degrees ATDC. Thereafter, exhaust valve closing (EVC) proceeds down closing curve 51 to complete closing at about 390 degrees ATDC. Operation with this nominal exhaust valve timing provides a relatively low in-cylinder temperature at the time of fuel injection which is near the piston top dead center position.

In operation, the nominal mode of operation is utilized for warm engine operation, warm ambient conditions, higher than nominal loading conditions, and various combinations of these operating conditions to provide reliable and consistent compression ignition of fuel injected into the combustion chambers at lower compression ratios such as 12:1 to 16:1 in low compression designs.

Such nominal exhaust curves, however sufficient for warm operation, may result in excessively high combustion instability and unburned hydrocarbon emissions at cold start conditions, cool ambient conditions and low engine loading conditions, particularly in low compression engine designs. Increase of combustion temperature and improvement in combustion stability is obtained by the method of actuating the cam phaser 36 to advance the exhaust valve timing, as shown by the exhaust curve labeled 43. Advances in the cam phaser position may be responsive, for example, to various engine operating and environmental conditions indicative of the desirability of invoking such control (e.g. cold engine, cool ambient air, low engine loads, excessive hydrocarbon emissions). With this cam timing, exhaust valve lift starts about 100 degrees ATDC. Valve lift proceeds along a lift curve 53 to a peak lift at about 230 degrees ATDC and then along a closing curve 54 to exhaust valve closing at about 357 degrees ATDC.

With this advanced timing, the exhaust valve closing is advanced relative to the nominal timing until about top dead center (TDC) of the respective pistons. Thus, the effective exhaust stroke is shortened by about 35 degrees from that of the nominal exhaust valve lift curve 41. The result is that trapped hot exhaust residuals are increased sufficiently to raise the in-cylinder temperature of the intake air fuel charge above that achievable with nominal valve lifts.

Figure 4:
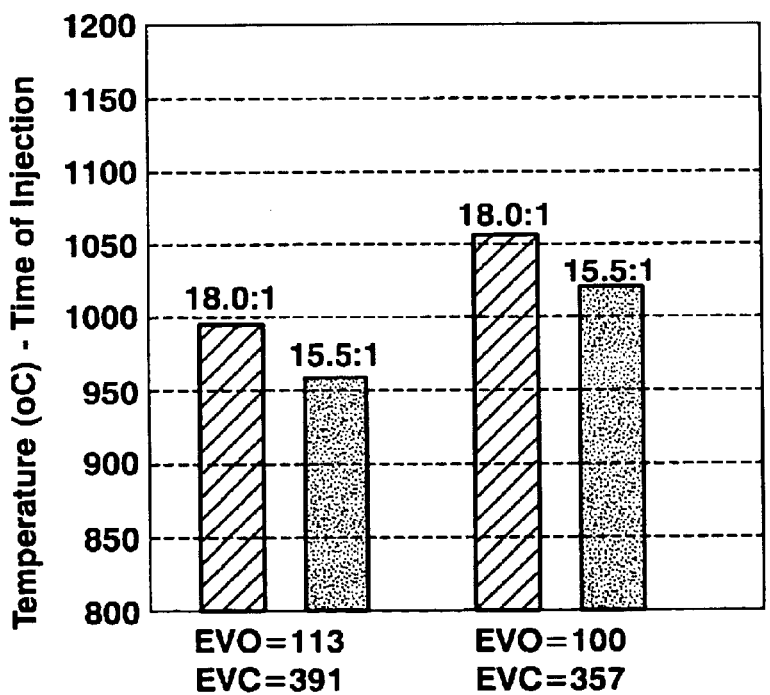

FIG. 4 shows a comparison of in-cylinder temperatures at time of fuel injection for nominal and advanced valve timing as described for compression ratios of 18.0:1 and 15.5:1. From this it can be seen that significant in-cylinder temperature control is achieved through the one-side phase control applied to the exhaust valves in accordance with the present invention.

When the engine is again operated at greater than nominal loads, during warm periods, or in warmer ambient conditions when the additional heat from increased trapped residual exhaust gases is no longer required for dependable compression ignition of the intake air fuel charge, the cam phaser is returned to the initial nominal position.

In order to use a cam phaser in the manner outlined for increasing the trapped hot exhaust gases and resulting compression temperatures of a diesel engine, the engine intake and exhaust valves must be operated by separate camshafts so that only the exhaust valves are advanced. The variations in valve timing for which cam phasers are utilized in spark ignition engines are not generally usable in diesel engines because the exhaust valve timing cannot be retarded nor the intake valve timing be advanced without the pistons contacting the valves due to the low piston to head clearance.

As previously mentioned, additional advantage may be had if the intake valve timing is retarded since delaying the opening of the intake valve until such a time after substantially all of the compression energy in the compressed exhaust gases is recovered by allowing it to push the piston after top dead center at the beginning of the intake stroke. An intake cam phaser is thus beneficially added to the intake cam and controlled in the same fashion as described with respect to the exhaust cam phaser by way of controlled pressurized oil. The intake valve timing of course is only retarded to reach the stated objective of recapturing most of the work that went into compressing the trapped exhaust gases and to avoid piston contact with the intake valves.

Thus, the application of cam phasers to a diesel engine is not known to have previously been considered practical. However, the use in the present invention, where only advancing of the exhaust valves from their nominal timing is utilized, provides a simple and low cost method of controlling combustion temperatures particularly during warm-up periods, low ambient temperature periods and low load periods. Additionally, the use in conjunction with advancing of the exhaust valves of retarding of the intake valves from their nominal timing provides an additional benefit in efficiency.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A diesel engine having cylinders and pistons defining expansible combustion chambers into which combustion supporting gas is compressed during compression strokes of the pistons for compression ignition and burning of injected fuel to drive a crankshaft, intake and exhaust valves actuated by crankshaft driven intake and exhaust camshafts for controlling the timed admission of air to and the discharge of exhaust from the combustion chambers, and the improvement comprising:

a cam phaser operative on the exhaust camshaft to selectively advance timing of only the exhaust valves relative to a nominal position to advance exhaust valve closing sufficiently to increase trapped exhaust gases, thereby increasing combustion temperatures in the combustion chambers for controlling combustion stability and exhaust emissions under predetermined conditions of operation.

2. A diesel engine as in claim 1 including a control effective to advance said cam phaser to increase the trapped exhaust gas for engine operation at one or more of cold engine, cold ambient and low load conditions to increase combustion temperatures.

3. A diesel engine as in claim 2 wherein the control is responsive to engine operating conditions selected from the group consisting of engine temperature, ambient temperature, exhaust gas constituents, engine load and combinations thereof.

4. A diesel engine as in claim 1 further comprising an intake cam phaser operative on the intake camshaft to selectively retard timing of only the intake valves relative to a nominal position to retard intake valve closing sufficiently to allow trapped exhaust gases to expand substantially to an uncompressed ratio.

5. A diesel engine as in claim 1 wherein the control is effective to vary exhaust valve timing from a nominal setting to an advanced closing timing of up to about 80 degrees of crankshaft rotation.

6. A method of operating a diesel engine including intake and exhaust valves for controlling exhaust emissions and improving combustion stability during selected conditions of engine operation comprising:

providing a cam phaser connected with an exhaust camshaft and operable to selectively advance exhaust cam timing relative to a nominal position for controlling timing of the exhaust valves; and, actuating the cam phaser to advance exhaust cam timing for engine operation during predetermined engine operating conditions to provide increased in-cylinder temperature of cylinder charge gases.

7. A method as in claim 6 wherein said predetermined engine operating conditions are selected from the group consisting of engine temperature, ambient temperature, exhaust gas constituents, engine load and combinations thereof.

8. A method as in claim 6 wherein the in-cylinder temperature is increased to lower hydrocarbon exhaust emissions.

9. A method as in claim 6 further comprising:

providing an intake cam phaser operative on the intake camshaft to selectively retard timing of only the intake valves relative to a nominal position for controlling timing of the intake valves; and actuating the intake cam phaser to retard intake cam timing for engine operation during said predetermined engine operating conditions to reduce thermodynamic losses occasioned by advanced exhaust cam timing.

10. A diesel engine having cylinders and pistons defining expansible combustion chambers into which combustion supporting gas is compressed during compression strokes of the pistons for compression ignition and burning of injected fuel to drive a crankshaft, intake and exhaust valves actuated by crankshaft driven intake and exhaust camshafts for controlling the timed admission of air to and the discharge of exhaust from the combustion chambers, and the improvement comprising:

an first cam phaser operative on the exhaust camshaft to selectively advance timing of only the exhaust valves relative to a nominal position to advance exhaust valve closing sufficiently to increase trapped exhaust gases, thereby increasing combustion temperatures in the combustion chambers for controlling combustion stability and exhaust emissions under predetermined conditions of operation; and, a second cam phaser operative on the intake camshaft to selectively retard timing of only the intake valves relative to a nominal position to retard intake valve closing sufficiently to allow trapped exhaust gases resulting from advanced exhaust valve closing to expand substantially to an uncompressed ratio.

\* \* \* \* \*